(12) United States Patent
Skubic et al.

(10) Patent No.: US 7,891,964 B2
(45) Date of Patent: Feb. 22, 2011

(54) VISCOSITY PUMP FOR EXTRUSION-BASED DEPOSITION SYSTEMS

(75) Inventors: Robert L. Skubic, Chanhassen, MN (US); James W. Comb, Hamel, MN (US); Jerome K. Grudem, Jr., Rogers, MN (US); William J. Swanson, St. Paul, MN (US); John Samuel Batchelder, Somers, NY (US); Steven M. Brose, Belle Plaine, MN (US)

(73) Assignee: Stratasys, Inc., Eden Prairie, MN (US)

( * ) Notice: Subject to any disclaimer, the term of this patent is extended or adjusted under 35 U.S.C. 154(b) by 371 days.

(21) Appl. No.: 12/069,536

(22) Filed: Feb. 11, 2008

(65) Prior Publication Data

US 2008/0213419 A1  Sep. 4, 2008

Related U.S. Application Data

(60) Provisional application No. 60/900,938, filed on Feb. 12, 2007.

(51) Int. Cl.
*B28B 1/16* (2006.01)
(52) U.S. Cl. .................. 425/375; 264/113; 264/308; 264/401
(58) Field of Classification Search .......... 425/375; 264/113, 308, 401
See application file for complete search history.

(56) References Cited

U.S. PATENT DOCUMENTS

| | | | |
|---|---|---|---|
| 3,633,494 A | | 1/1972 | Schippers et al. |
| 4,818,449 A | * | 4/1989 | Yamada et al. ............. 264/29.2 |
| 5,121,329 A | | 6/1992 | Crump |
| 5,303,141 A | | 4/1994 | Batchelder et al. |
| 5,312,224 A | | 5/1994 | Batchelder et al. |
| 5,340,433 A | | 8/1994 | Crump |
| 5,503,785 A | | 4/1996 | Crump et al. |
| 5,567,463 A | | 10/1996 | Schaaf |
| 5,633,021 A | * | 5/1997 | Brown et al. ............... 425/375 |
| 5,695,707 A | | 12/1997 | Almquist et al. |

(Continued)

OTHER PUBLICATIONS

Official Search Report of the Patent Cooperation Treaty in counterpart foreign Application No. PCT/US2008/001783 filed Feb. 11, 2008.

(Continued)

*Primary Examiner*—Maria Veronica D Ewald
(74) *Attorney, Agent, or Firm*—Brian R. Morrison; Westman, Champlin & Kelly, P.A.

(57) ABSTRACT

A pump system comprising a delivery assembly configured to feed a solid material under operational power of a first drive motor, and a screw pump comprising a housing that at least partially defines a barrel of the screw pump, an extrusion tip secured to the housing at a first end of the barrel, a liquefier secured to the housing and intersecting with the barrel, and an impeller extending at least partially through the barrel. The liquefier is configured to receive the solid material fed from the delivery assembly, to at least partially melt the received solid material, and to direct the at least partially melted material to the barrel, and the impeller is configured to drive the at least partially melted material that is directed to the barrel toward the extrusion tip under operational power of a second drive motor.

19 Claims, 14 Drawing Sheets

U.S. PATENT DOCUMENTS

| | | |
|---|---|---|
| 5,764,521 A | 6/1998 | Batchelder et al. |
| 5,866,058 A | 2/1999 | Batchelder et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,085,957 A | 7/2000 | Zinniel et al. |
| 6,129,872 A | 10/2000 | Jang |
| 6,193,923 B1 | 2/2001 | Leyden et al. |
| 6,228,923 B1 | 5/2001 | Lombardi et al. |
| 6,547,995 B1 | 4/2003 | Comb |
| 6,549,201 B1 | 4/2003 | Igarashi et al. |
| 6,629,011 B1 | 9/2003 | Calderon et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,814,907 B1 | 11/2004 | Comb |
| 6,923,634 B2 | 8/2005 | Swanson et al. |
| 2005/0129941 A1 | 6/2005 | Comb et al. |
| 2006/0106121 A1 | 5/2006 | Seki et al. |

OTHER PUBLICATIONS

Chinese Office Action dated Aug. 30, 2010 for corresponding Chinese Patent Application No. 200880004820.0, filed Feb. 11, 2008.

* cited by examiner

VISCOSITY PUMP FOR EXTRUSION-BASED DEPOSITION SYSTEMS

CROSS-REFERENCE TO RELATED APPLICATION(S)

This application claims priority to U.S. Provisional Application No. 60/900,938, filed on Feb. 12, 2007, and entitled "Viscosity Pump For Extrusion-Based Deposition Systems", the disclosure of which is incorporated by reference in its entirety.

BACKGROUND

The present invention relates to the fabrication of three-dimensional (3D) objects using extrusion-based layered manufacturing systems. In particular, the present invention relates to viscosity pumps used with extrusion-based layered manufacturing systems for fabricating 3D objects.

An extrusion-based layered manufacturing system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through a nozzle carried by an extrusion head, and is deposited as a sequence of roads on a substrate in an x-y plane. The extruded build material fuses to previously deposited build material, and solidifies upon a drop in temperature. The position of the extrusion head relative to the base is then incremented along a z-axis (perpendicular to the x-y plane), and the process is then repeated to form a 3D object resembling the CAD model.

Movement of the extrusion head with respect to the base is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second extrusion tip pursuant to the generated geometry during the build process. The support material adheres to the build material during fabrication, and is removable from the completed 3D object when the build process is complete.

SUMMARY

The present invention relates to a pump system suitable for use in an extrusion-based deposition system. The pump system includes a delivery assembly operably engaged with a first drive motor, and a screw pump that includes a housing that at least partially defines a barrel of the screw pump, an extrusion tip secured to the housing at a first end of the barrel, a liquefier secured to the housing and intersecting with the barrel, and an impeller extending at least partially through the barrel. The delivery assembly is configured to feed a solid material under operational power of the first drive motor. The liquefier is configured to receive the solid material fed from the delivery assembly, to at least partially melt the received solid material, and to direct the at least partially melted material to the barrel. The impeller is configured to drive the at least partially melted material that is directed to the barrel toward the extrusion tip under operational power of the second drive motor.

DETAILED DESCRIPTION

Figure 1A:
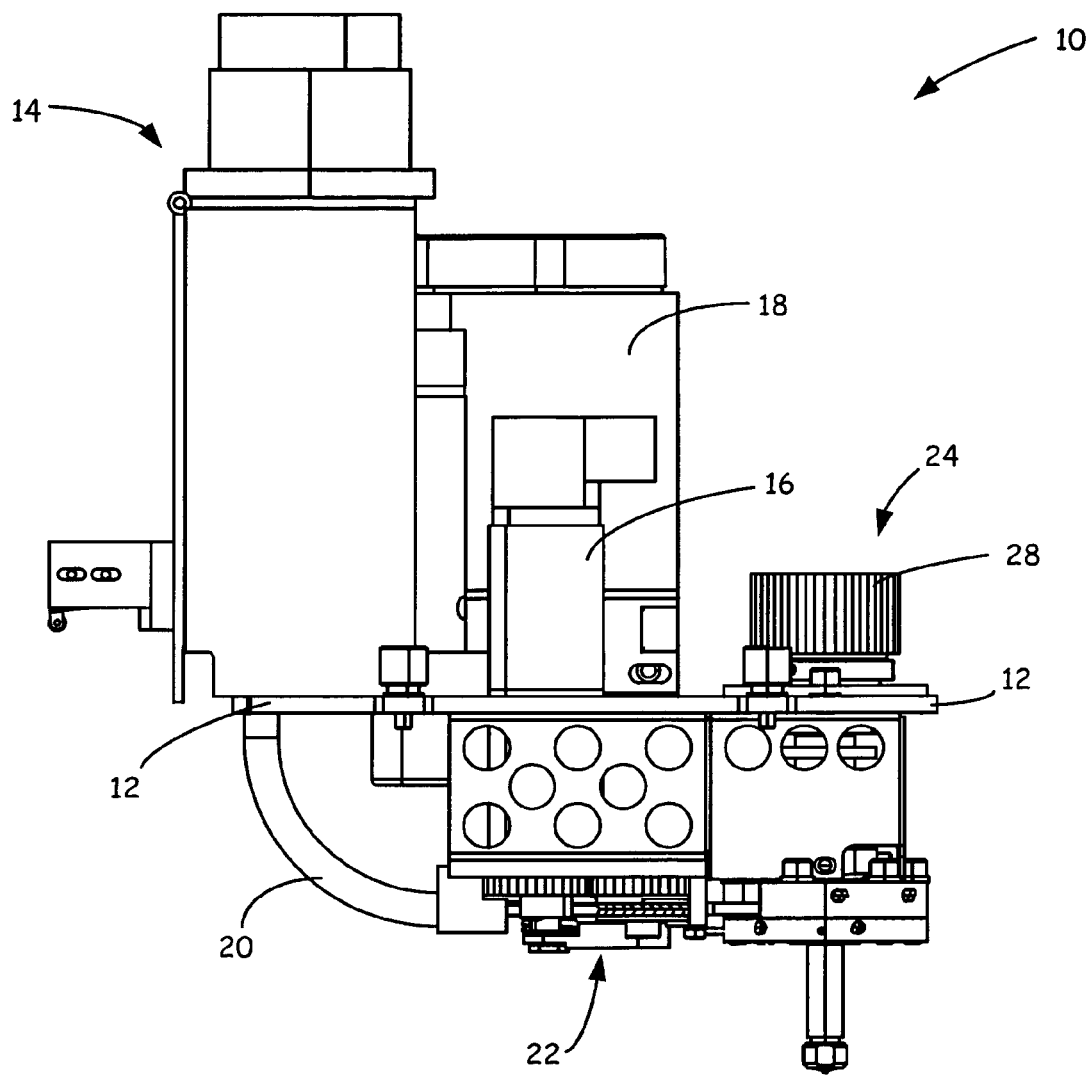
FIG. 1A is a side view of a two-stage pump system of the present invention.
Figure 1B:
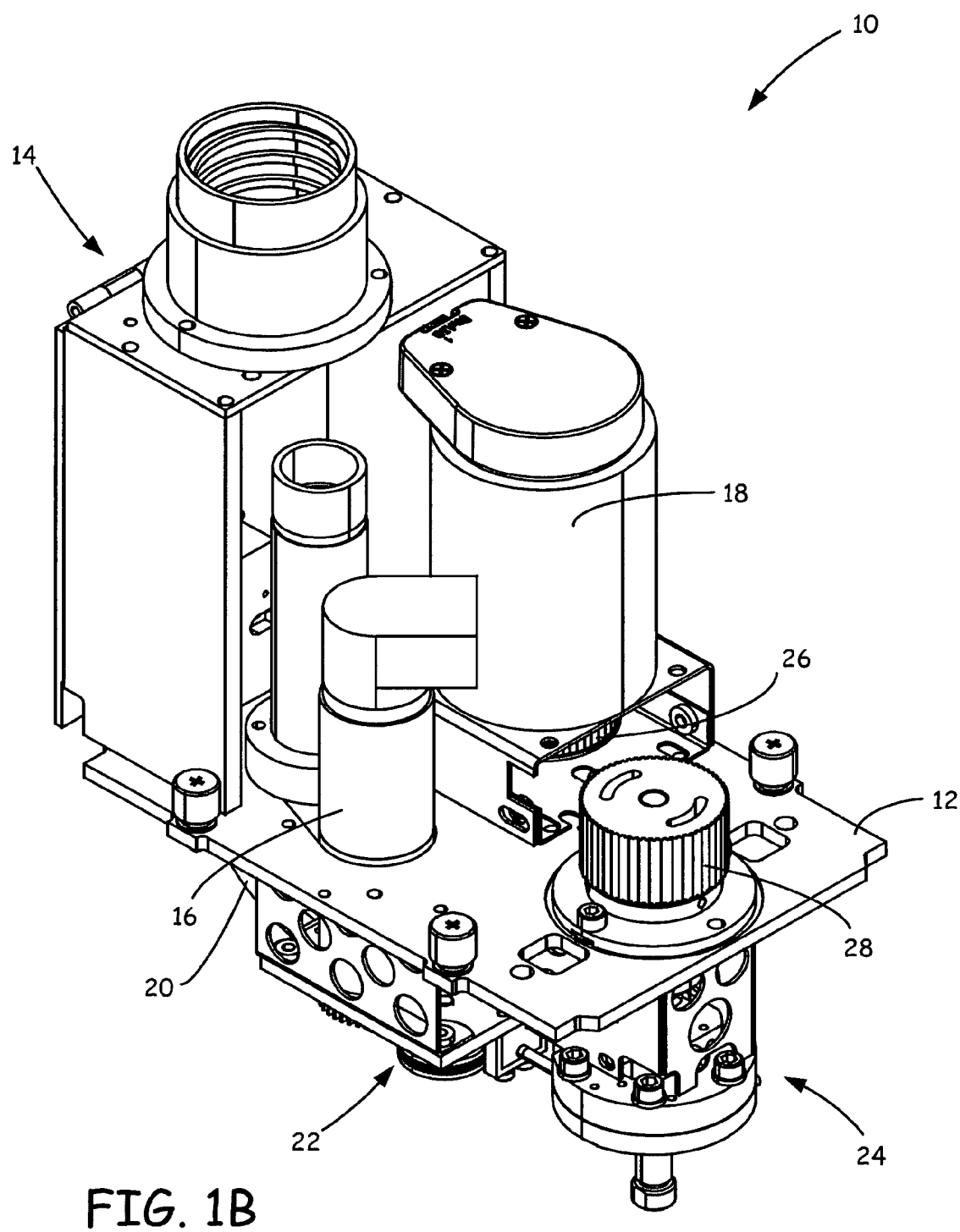
FIG. 1B is a perspective view of the two-stage pump system of the present invention.

FIGS. 1A and 1B are respectively a side view and a perspective view of two-stage pump system 10, which is a suitable extrusion system for use as an extrusion head in an extrusion-based layered manufacturing system (e.g., fused deposition modeling systems developed by Stratasys, Inc., Eden Prairie, Minn.). As shown in FIG. 1A, pump system 10 includes frame 12, inlet portion 14, drive motors 16 and 18, guide tube 20, filament delivery assembly 22, and screw pump 24.

Frame 12 is a support structure of pump system 10, and each of inlet portion 14, drive motors 16 and 18, guide tube 20, filament delivery assembly 22, and screw pump 24 are directly or indirectly connected to frame 12. Inlet portion 14 is a structure that provides a convenient inlet port for receiving a filament of build or support material (not shown) from a filament source (not shown). Guide tube 20 is a tube extending into inlet portion 14 for guiding the filament from the filament source to filament delivery assembly 22.

Drive motor 16 and filament delivery assembly 22 define a first stage of pump system 10. Drive motor 16 is a first motor extending through frame 12, and which is configured to operate filament delivery assembly 22. Filament delivery assembly 22 is disposed below frame 12, and includes a system of gears and pinch rollers operated by drive motor 16. This arrangement allows filament delivery assembly 22 to feed the filament from guide tube 20 to screw pump 24.

As shown in FIG. 1B, pump system 10 also includes motor pulley 26, which is axially connected to drive motor 18. Drive motor 18 is a second motor secured above frame 12, and which is configured to operate screw pump 24 via motor pulley 26. Accordingly, drive motor 18, screw pump 24, and motor pulley 26 define a second stage of pump system 10. Screw pump 24 extends through frame 12, and includes belt pulley 28, which is operably connected to motor pulley 26 by a belt (not shown). This allows the rotation of motor pulley 26 (via drive motor 18) to correspondingly rotate belt pulley 28 (via the belt). As discussed below, the rotation of belt pulley 28 correspondingly rotates an impeller of screw pump 24 (not shown in FIG. 1A or 1B).

During operation, drive motor 16 causes filament delivery assembly 22 to feed the filament of build or support material to screw pump 24, where the filament is melted to provide build material in a flowable state. Drive motor 18 then rotates the impeller of screw pump 24 (via motor pulley 26, belt pulley 28, and the timing belt) to extrude the flowable material, thereby forming the 3D object or a support structure in a layer-by-layer manner.

As discussed below, pump system 10 extrudes flowable materials at flow rates higher than are typically achieved with a standard liquefier pump. Additionally, pump system 10 provides a more constant response time. Response time is a function of the volume of flowable material in a pump. In a standard liquefier pump, the volume of flowable material is typically proportional to the flow rate. For example, at low rates, the filament in the liquefier has time to melt so that most of the liquefier volume is melted and response time is slow. However, at high flow rates, the melted volume decreases, thereby increasing the response time. Because most 3D objects have varied geometries that are built at varied extrusion flow rates, the response times of standard liquefier pumps vary as well. In contrast, volume of flowable materials in screw pump 24 is kept low. As such, the response time of pump system 10 is fast and may be held substantially constant.

Figure 2A:
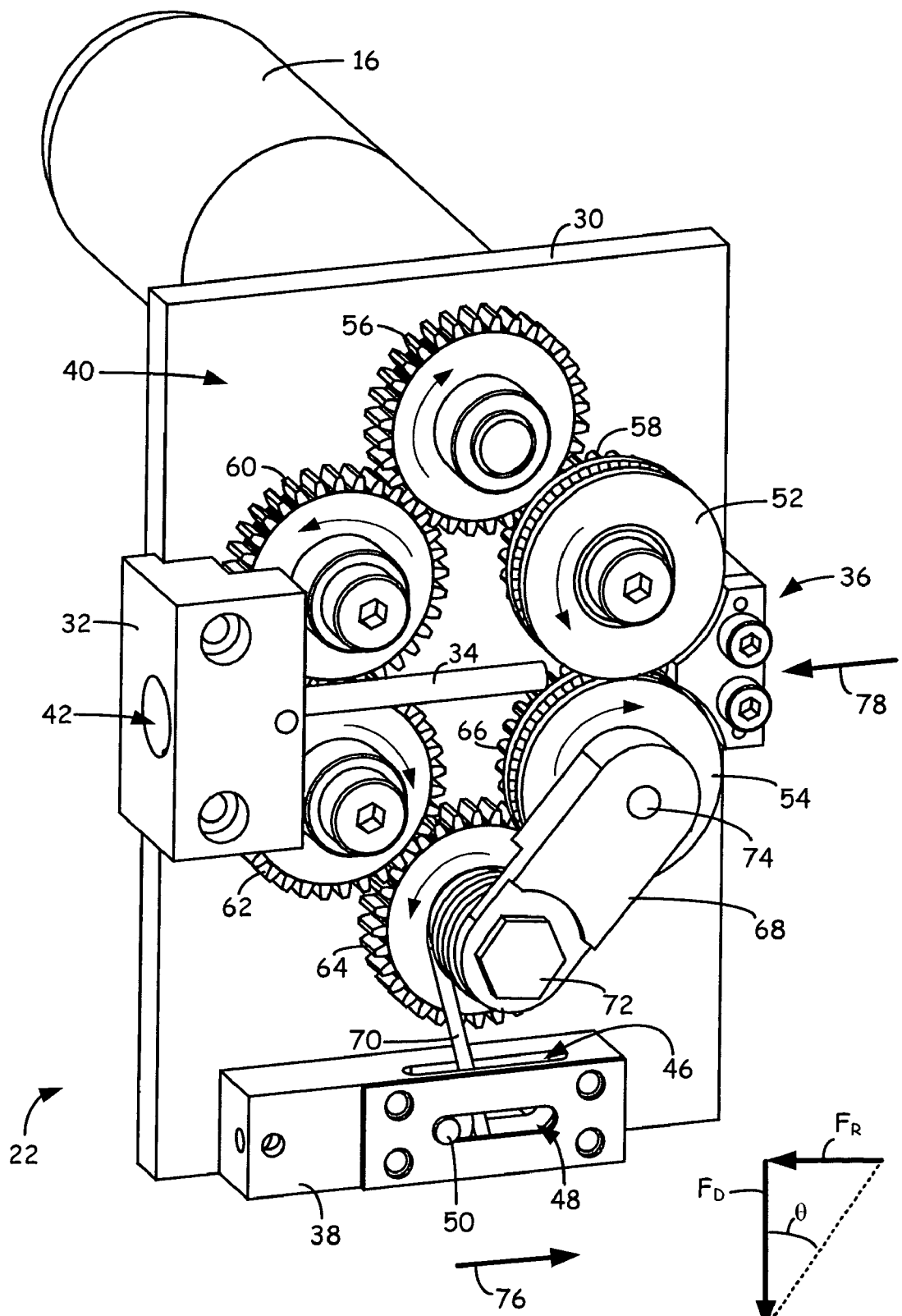
FIGS. 2A and 2B are bottom views of a filament delivery assembly of the two-stage pump system.
Figure 2B:
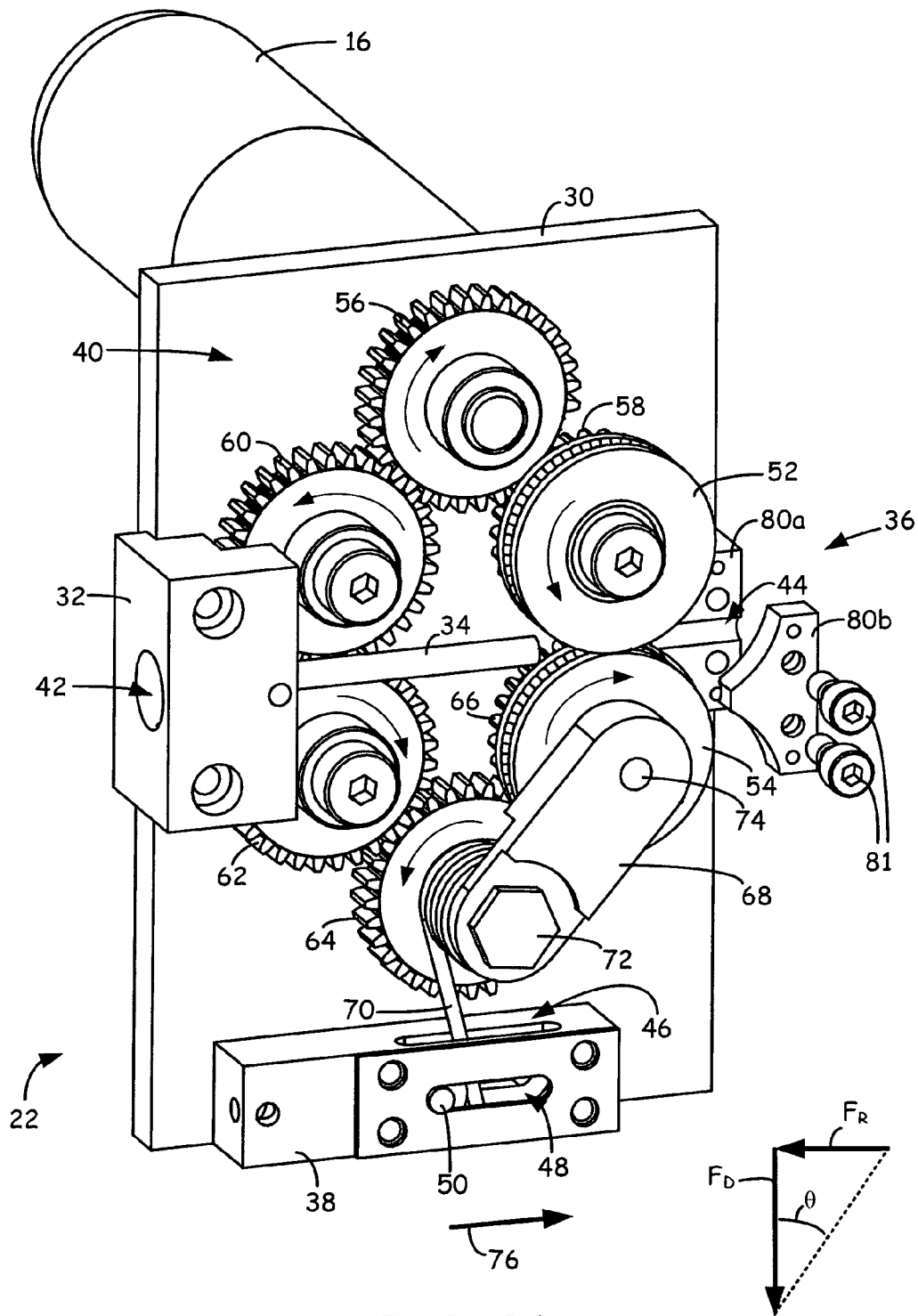

FIGS. 2A and 2B are bottom perspective views of drive motor 16 and filament delivery assembly 22, where filament delivery assembly 22 is an example of a suitable material advance mechanism for feeding a filament of build or support material (not shown) to screw pump 24 (shown in FIGS. 1A and 1B). Filament delivery assembly 22 includes support plate 30, feed block 32, filament tube 34, exit block 36, biasing block 38, and gear system 40, where support plate 30 is retained by frame 12 (shown in FIGS. 1A and 1B).

Feed block 32 is secured to support plate 30, and includes channel 42 extending through feed block 32. Feed block 32 is the portion of filament delivery assembly 22 that is connected to guide tube 20 (shown in FIGS. 1A and 1B), where the filament of build or support material is fed from guide tube 20 to channel 42. Filament tube 34 extends from the opposing end of channel 42 from guide tube 20, and provides a pathway for directing the filament toward exit block 36. Exit block 36 is secured to support plate 30, and includes exit channel 44 (shown in FIG. 2B) for guiding the filament toward screw pump 24, as discussed below. Biasing block 38 is also secured to support plate 30, and includes slots 46 and 48, and pin 50, where pin 50 extends through slot 48.

Gear system 40 includes drive rollers 52 and 54, drive gear 56, idler gears 58, 60, 62, 64, and 66, support arm 68, and torsion spring 70. Drive rollers 52 and 54 are rotatable rollers that grip and pull the filament from filament tube 34 toward exit block 36. Drive gear 56 and idler gears 58, 60, 62, 64, and 66 are a series of engaged gears, where idler gears 58, 60, 62, and 64 are axially connected to support plate 30, thereby allowing idler gears 58, 60, 62, and 64 to rotate. As shown, drive roller 52 is axially connected to idler gear 58, and drive roller 54 is axially connected to idler gear 66. Furthermore, drive gear 56 is axially connected to drive motor 16 through support plate 30. This arrangement allows drive motor 16 to rotate drive gear 56 during operation, which correspondingly rotates idler gears 58, 60, 62, 64, and 66. The rotation of idler gears 58 and 66 respectively rotate drive rollers 52 and 54.

In this embodiment, drive roller 54 and idler gear 66 are not secured to support plate 30, and idler gear 58 does not directly engage with idler gear 66. Support arm 68 has a first end connected axially to idler gear 64 via bolt 72, and a second end connected axially to drive roller 54 and idler gear 66 via pin 74. Thus, drive roller 54, idler gear 66, and support arm 68 are pivotally secured to support plate 30 around bolt 72, while also allowing idler gear 66 to remain engaged with idler gear 64. Torsion spring 70 has a first end secured around a pin (not shown), a body that is axially aligned with bolt 72, and a second end that engages biasing block 38. This applies torsion on support arm 68 in a counter-clockwise direction in FIG. 2A. At biasing block 38, torsion spring 70 extends within slot 46, and biases against pin 50. As a result, pin 50 may be used to adjust the torsion on support arm 68.

When pin 50 is moved toward the right of slot 48 (in a direction of arrow 76), drive roller 54, idler gear 66, and support arm 68 pivot around bolt 72 (in a counter-clockwise direction in FIG. 2A). This increases the contact force between drive rollers 52 and 54. As discussed below, pin 50 is desirably positioned within slot 48 such that the contact force between drive rollers 52 and 54 is about zero (or slightly greater than zero), thereby minimizing the pressure between drive rollers 52 and 54. Pin 50 may then be secured at the given position within slot 48 to preload drive roller 54 at the desired force.

The angular position of support arm 68 provides a mechanism that self corrects for filament slippage between drive rollers 52 and 54. During operation, drive rollers 52 and 54 are reacted upon by a resistive force ($F_R$) (in a direction of arrow 78), which results from the filament's resistance to being pushed into and within screw pump 24. The filament in contact with drive rollers 52 and 54 has a given coefficient of friction ($\mu$) based on the filament composition and texture. As such, assuming that the contact force between drive rollers 52 and 54 is about zero (from the position of torsion spring 70), drive rollers 52 and 54 drive the filament toward exit block 36 without filament slippage when a drive force ($F_D$) applied to the filament times the coefficient of friction ($\mu$) of the filament are greater than the resistive force ($F_R$). Accordingly, the threshold for filament slippage is at:

$$F_D \times \mu = F_R, \text{ or} \quad \text{(Equation 1)}$$

$$\mu = F_D/F_R \quad \text{(Equation 2).}$$

When the resistive force ($F_R$) and the drive force ($F_D$) are respectively represented as force vectors (i.e., force vectors $F_R$ and $F_D$ in FIG. 2A), the angle θ of support arm 68 from an axis perpendicular to support block 38 (parallel to force vector $F_D$) may be defined by the following equation:

$$\tan(\theta) = F_R/F_D \quad \text{(Equation 3)}$$

which substituted with Equation 2, provides:

$$\text{Angle } \theta = \arctan(\mu) \quad \text{(Equation 4).}$$

Accordingly, orienting support arm 68 at angle θ provides a mechanism that self corrects for filament slippage because the pinch force between drive rollers 52 and 54 changes in response to a change in resistive force ($F_R$). For example, when the resistive force ($F_R$) increases due to resistive pressures in screw pump 24, the pinch force between drive rollers 52 and 54 increases to provide a higher level of drive force ($F_D$) on the filament, thereby reducing the risk of filament slippage. Preferably, angle θ is determined to be slightly less than arctan(μ), and/or the contact force between drive rollers 52 and 54 is set slightly greater than zero, to provide a safety margin against slippage.

During operation, the filament of build or support material is fed through channel 42 of feed block 32, through filament tube 34, and between drive rollers 52 and 54. Drive motor 16 then rotates drive gear 56. This correspondingly rotates idler gears 58, 60, 62, 64, and 66 (as represented by the rotational arrows in FIG. 2A). The rotation of idler gear 58 correspondingly rotates drive roller 52, and the rotation of idler gear 66 correspondingly rotates drive roller 54. The rotation of drive rollers 52 and 54 grip and pull successive portions of the filament toward exit block 36.

As shown in FIG. 2B, exit block 36 includes base portion 80a and cap portion 80b, which define exit channel 44, and which are secured together with bolts 81. Exit block 36 provides a mechanism for guiding the filament from gear system 40 toward screw pump 24 and reduces the risk of the filament buckling under the incurred resistive force ($F_R$). Cap portion 80b is desirably removably securable to base portion 80a to allow access to exit channel 44 for cleaning and repair purposes (e.g., removal of plugged filaments in exit channel 44).

In alternative embodiments, gear system 40 may include additional or fewer numbers of idler gears as individual designs may necessitate. In another alternative embodiment, which does not provide self-tightening capabilities, gear 58 is axially connected to drive motor 16, and directly engages with idler gear 66. This allows drive motor 16 to directly rotate gear 58 and drive roller 52, which correspondingly rotates idler gear 66 and drive roller 54. In this embodiment, drive roller 54 and idler gear 66 are rotatably secured to support plate 30, and drive gear 56 and idler gears 60, 62, and 64 may be omitted. In another alternative embodiment, drive roller 54 may be replaced with an idler roller (not shown) that is not directly or indirectly engaged with drive roller 52. In this embodiment, the idler roller is either rotatably secured to support plate 30 (i.e., no self-tightening capabilities), or to a biased support arm 68 (as shown in FIGS. 2A and 2B).

Figure 3:
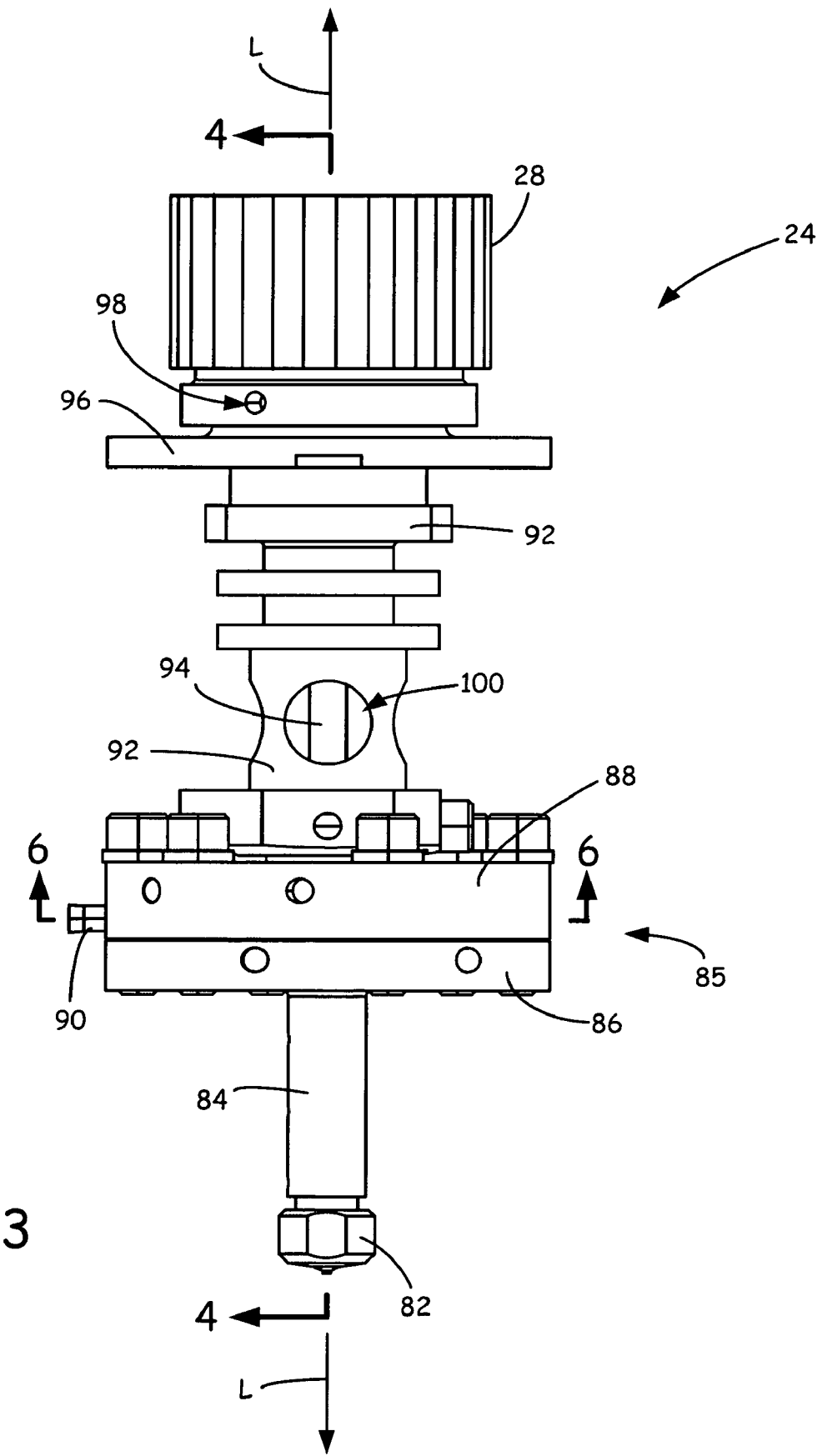
FIG. 3 is a side view of a screw pump of the two-stage pump system.

FIG. 3 is a side view of screw pump 24 extending along longitudinal axis L. As shown from bottom-to-top in FIG. 3, screw pump 24 further includes extrusion tip 82, barrel housing 84, liquefier 85 (defined by liquefier housings 86 and 88), feed channel 90, screw pump body 92, impeller 94, and mounting plate 96. Extrusion tip 82 is removably connected to barrel housing 84, and is the portion of screw pump 24 from which flowable material is extruded.

Barrel housing 84 is a circumferential housing component that encases a bottom portion of impeller 94, and is desirably formed integrally with liquefier housing 86. Liquefier housings 86 and 88 are housing components secured together (e.g., bolted) to define liquefier 85, thereby encasing a central portion of impeller 94. Feed channel 90 is an opening into upper impeller housing 88, and is configured to receive the filament of build or support material from filament delivery assembly 22 (shown in FIGS. 1A and 1B).

Screw pump 24 also includes threaded bore 98, which is an opening in screw pump 24, above mounting plate 96, for receiving a setscrew (not shown). Screw pump body 92 is secured to upper impeller housing 88, and is a housing component that encases an upper portion of impeller 94. Mounting plate 96 is a plate secured to screw pump body 92 and is the portion of screw pump 24 that is secured to frame 12 (shown in FIGS. 1A and 1B). Screw pump body 92 includes vent aperture 100, which extends through screw pump body 92 at a location above liquefier housing 88, and provides an opening through which impeller 94 is visible.

When mounted onto frame 12, belt pulley 28 is rotated via a motor-driven belt (not shown), which correspondingly causes impeller 94 to rotate. While impeller 94 rotates, the filament of build or support material is fed into screw pump 24 via feed channel 90, and is melted to a flowable state. The flowable material is then extruded through extrusion tip 82 by the rotation of impeller 94.

Figure 4:
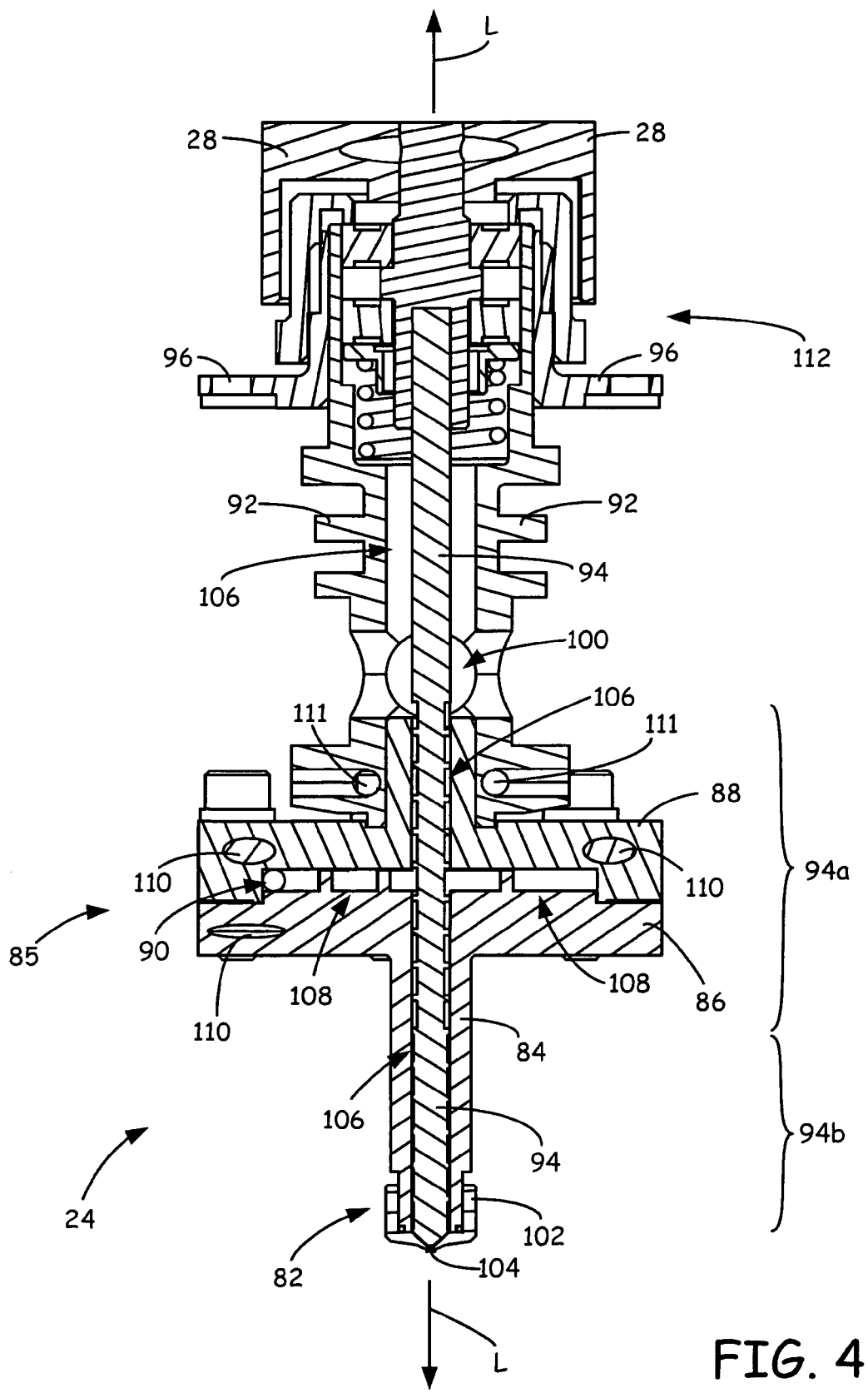
FIG. 4 is a sectional view of section 4-4 taken in FIG. 3, showing an interior region of the screw pump.

FIG. 4 is a sectional view of section 4-4 in FIG. 3, which illustrates the interior region of screw pump 24. As shown in FIG. 4, extrusion tip 82 includes nozzle 102 and orifice 104, where orifice 104 is an opening in nozzle 102, along longitudinal axis L, for extruding the flowable material. Nozzle 102 is removably screwed on to barrel housing 84, which allows nozzle 102 to be replaced as necessary (e.g., for providing different orifice diameters).

Barrel housing 84, liquefier housings 86 and 88, and screw pump body 92 define interior barrel 106, which is a central cylindrical cavity that extends along longitudinal axis L. As shown, barrel 106 is accessible through vent aperture 100. Impeller 94 extends through barrel 106 along longitudinal axis L, and impeller 94 and barrel 106 desirably have closely matching surfaces (i.e., the outer diameter of impeller 94 closely matches the diameter of barrel 106) at least within barrel housing 84 and liquefier 85.

Liquefier housings 86 and 88 also define liquefier cavity 108, which is a disk-shaped cavity within liquefier 85, and is connected to feed channel 90. Due to its disk-like shape, liquefier 85 is commonly referred to as a "hockey puck liquefier". As discussed below, liquefier 85 melts the successive portions of solid filament that enter liquefier cavity 108 through the feed channel 90. Liquefier housings 86 and 88 include heater rods 110, which supply heat to liquefier cavity 108. This convectively heats liquefier cavity 108, allowing liquefier cavity 108 to thermally melt the filament to a desired flowable viscosity.

Screw pump body 92 also includes upper-body heaters 111 located between liquefier housing 88 and vent aperture 100. Heaters 111 prevent the flowable material from solidifying with barrel 106, above liquefier housing 88. This is desirable so that the meniscus of flowable material rises and falls within barrel 106, thereby providing a decoupling function during momentary imbalances in the feed rate between filament delivery assembly 22 and screw pump 24.

In alternative embodiments, screw pump 24 may include additional or fewer heating elements to obtain desired thermal profiles in barrel 106 and/or liquefier cavity 108. In one embodiment, one or more of heater rods 110 and heaters 111 may be independently controlled via temperature feedbacks monitored with one or more thermocouples (not shown).

Impeller 94 is secured to belt pulley 28 at top portion 112 of screw pump 24. As discussed below, this allows the rotational movement of belt pulley 28 to correspondingly rotate impeller 94. Impeller 94 has a plurality of spiral grooves cut in its outer surface that form a viscosity pump with barrel 106. The upper portion of the spiral grooves (referred to as portion 94a) has relatively deep grooves, thereby providing viscosity pumping at relatively high volume and low pressure (i.e., a transport zone of impeller 94). The lower portion of the spiral grooves (referred to as portion 94b) has relatively shallow grooves, thereby providing viscosity pumping at relatively high pressure and low volume (i.e., a pressurizing zone of impeller 94).

During operation, the filament of build or support material is fed into liquefier cavity 108 and is melted to a desired flowable viscosity. As successive portions of the filament continue to feed into liquefier cavity 108, the filament travels circumferentially inwards (i.e., in a spiral manner) while melting. The melted, flowable material eventually reaches the transport zone of impeller 94 (i.e., adjacent portion 94a of impeller 94), where the rotation of impeller 94 drives the flowable material into the pressurizing zone of impeller 94 (i.e., adjacent portion 94b of impeller 94). Portion 94b of impeller 94 increases the pressure of the flowable material, and extrudes the flowable material out through orifice 104 of extrusion tip 82. The extrusion rate of the flowable material may then be controlled by the rotation rate of impeller 94 (which corresponds to the driving power of drive motor 18). The extruded material is deposited in a desired pattern to form a 3D object and/or a support structure.

Screw pump 24 is beneficial for producing high flow rates and fast, predictable response times. To improve the pump response time, the build material volume within barrel 106 is desirably reduced by minimizing the clearance between impeller 94 and barrel 106. For example, a cylindrical screw pump with a 0.25-inch diameter impeller and a 0.001-inch clearance, which can pump 20,000 cubic-microinches/second through a 0.016-inch diameter nozzle, will have a time constant less than 0.010 seconds. In comparison, a liquefier pump that can pump only 2,000 cubic-microinches/second through a 0.016-inch diameter nozzle may have a time constant of greater than 0.020 seconds.

In the event that the filament is fed into liquefier cavity 108 faster than the flowable material is extruded out of the orifice 104, excess flowable material may backflow upward through barrel 106. If the backup is too great (e.g., if orifice 104 is clogged), excess flowable material may exit from screw pump 24 via vent aperture 100. Vent aperture 100 protects top portion 112 of screw pump 24 from accidental exposure to the flowable material, and ensures that the backflowing build material does not remain in liquefier cavity 108 long enough to thermally degrade (e.g., discolor) and then get re-mixed and extruded in subsequent processing. Vent aperture 100 is also beneficial for venting any gases (e.g., water vapor) present within liquefier cavity 108.

In one embodiment, screw pump 24 may also include one or more overflow sensors (not shown) within barrel 106. The overflow sensor(s) may be used to monitor when the backflow of flowable material is about to reach vent aperture 100. If the overflow sensor(s) detect a backup of flowable material, the overflow sensor(s) may then direct drive motor 16 (shown in FIGS. 1A, 1B, 2A, and 2B) to reduce or halt the feed rate of the filament.

In an additional alternative embodiment, liquefier 85, and optionally, barrel housing 84 may be removable and clamped to screw pump body 92. This allows multiple liquefiers to be readily interchanged for servicing or replacement.

Figure 5:
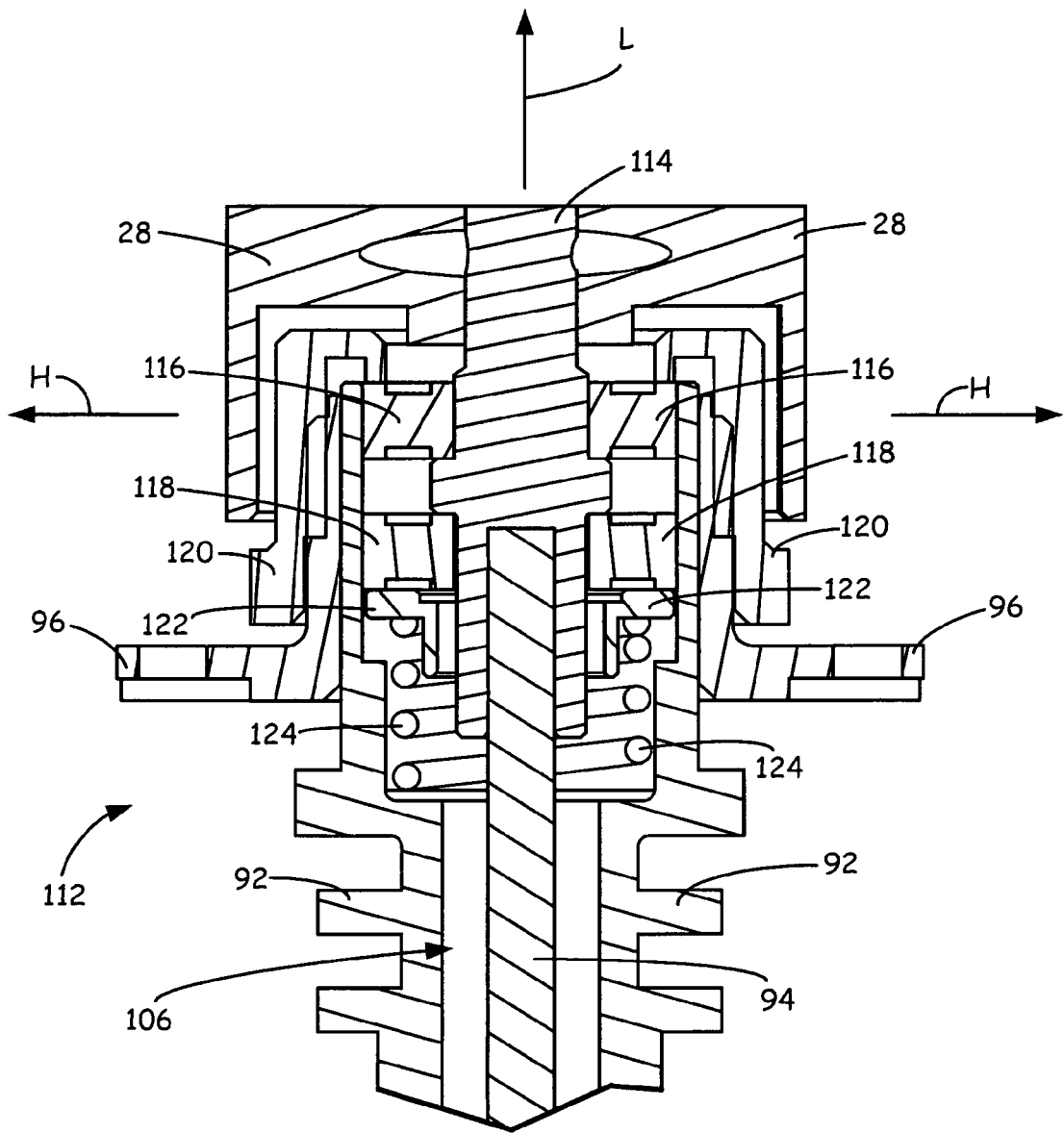
FIG. 5 is an expanded sectional view of a top portion of the screw pump.
Figure 5:
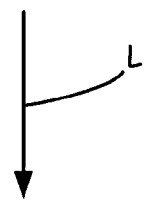

FIG. 5 is an expanded view of top portion 112 of screw pump 24, further illustrating the connection between belt pulley 28 and impeller 94. As shown, top portion 112 of screw pump 24 includes impeller extension 114, top bearing 116, bottom bearing 118, threaded collar 120, spacer 122, and spring 124. Impeller extension 114 is secured to belt pulley 28 and impeller 94, thereby allowing the rotation of belt pulley 28 to correspondingly rotate impeller 94 around longitudinal axis L.

Top bearing 116 and bottom bearing 118 are disposed between screw pump body 92 and impeller extension 114. Bottom bearing 118 and spring 124 are loaded on opposing surfaces of spacer 122, where spring 124 is biased against spacer 122. The portion of impeller extension 114 adjacent bottom bearing 118 is undercut in diameter so as not to radially constrain bottom bearing 118. Therefore, impeller 94 and impeller extension 114 are only radially constrained by top bearing 116 and hydrodynamic centering forces between impeller 94 and barrel housing 84 (shown in FIG. 3).

Top bearing 116 is located above bottom bearing 118 and is axially retained within screw pump body 92 via threaded collar 120. The motor-driven belt (not shown) and top bearing 116 are desirably aligned along horizontal axis H, thereby reacting the radial load of the motor-driven belt, and reducing any potential side loads placed on impeller 94. Because of the tight radial clearance between impeller 94 and barrel 106, it is desirable to reduce contact between impeller 94 and barrel 106, even at low rotational speeds where the hydrodynamic centering forces are low.

Threaded collar 120 is located within and below belt pulley 28, and is used to adjust the gap between extrusion tip 82 (shown in FIGS. 3 and 4) and impeller 94. To adjust the gap between extrusion tip 82 and impeller 94, threaded collar 120 is rotated, which compresses or relieves the biasing force on spring 124 (depending on whether the gap is reduced or increased). When a desired gap size is obtained, a setscrew (not shown) is inserted into threaded bore 98 (shown in FIG. 3) to prevent further rotation of threaded collar 120.

Figure 6:
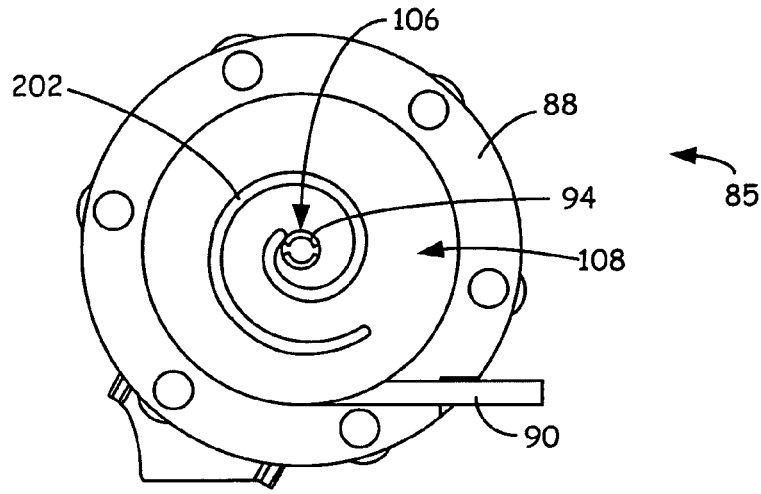
FIG. 6 is a sectional view of section 6-6 taken in FIG. 3, showing a liquefier cavity of the screw pump.

FIG. 6 is a sectional view of section 6-6 taken in FIG. 3, illustrating liquefier cavity 108 within liquefier 85. As shown, liquefier cavity 108 includes spiral baffle 202. Spiral baffle 202 causes the melting filament to flow in a decreasing spiral toward impeller 94, thereby reducing the risk of forming stagnant pockets of the melted, flowable material.

The flowable material is desirably delivered to barrel 106 at a flow rate that matches the extrusion flow rate from extrusion tip 82 (shown in FIGS. 3 and 4). Overfilling barrel 106 may cause the flowable material to backflow through vent aperture 100 (shown in FIGS. 3 and 4). Alternatively, underfilling barrel 106 may result in a low flow volume. The flow rate within liquefier 85 can be matched to the extrusion flow rate from extrusion tip 82 by controlling the filament feed rate from filament delivery assembly 22 (shown in FIGS. 1A, 1B, 2A, and 2B).

The filament feed rate may be responsive to one or more feedback sensors, thereby controlling drive motor 16 (shown in FIGS. 1A, 1B, 2A, and 2B). For example, a force sensor (e.g., load cells) can be placed on frame 12 or drive motor 16 to monitor the flow rates of liquefier 85. An example of a suitable force sensor is disclosed in Zinniel et al., U.S. Pat. No. 6,085,957, where the force sensor reacts to the force of the filament being driven into liquefier 85. Accordingly, the flow rate of liquefier 85 is increased if the measured force is too low, and is decreased if the force is too great. Open loop regulation of flowable material is also obtainable by matching response characteristics of liquefier 85. Additionally, as discussed above, the overflow sensor(s) at vent aperture 100 may be used to adjust the filament feed rate in the same manner.

Figures 7A, 7B:
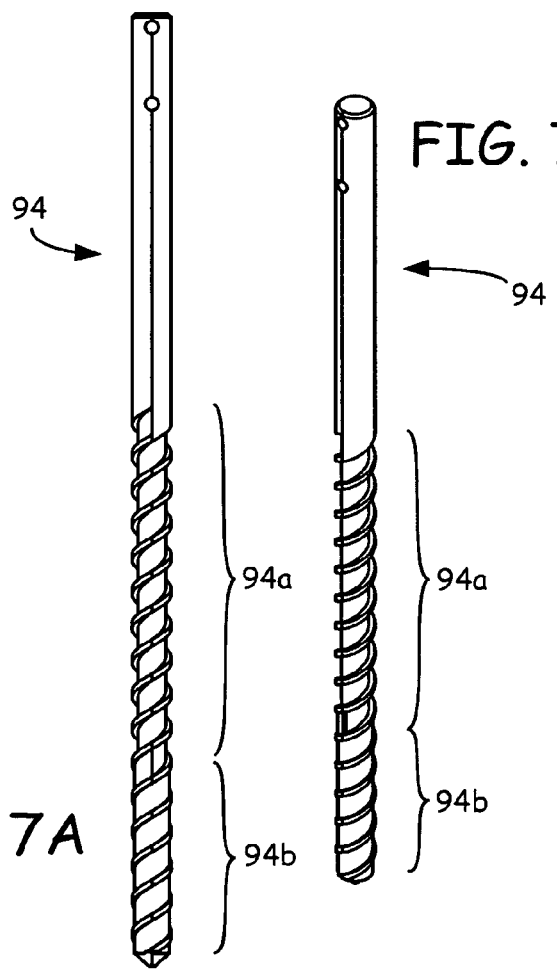
FIG. 7A is a side view of an impeller of the screw pump.
FIG. 7B is a perspective view of the impeller of the screw pump.

FIGS. 7A and 7B are respectively a side view and a perspective view of impeller 94. As shown, two grooves begin in portion 94a, each of which transition to shallower grooves in the portion 94b. As discussed above, portion 94a has relatively deep grooves to provide viscosity pumping at relatively high volume and low pressure (i.e., a transport zone of impeller 94). Correspondingly, portion 94b has relatively shallow grooves to provide viscosity pumping at relatively high pressure and low volume (i.e., a pressurizing zone of impeller 94).

Figure 8:
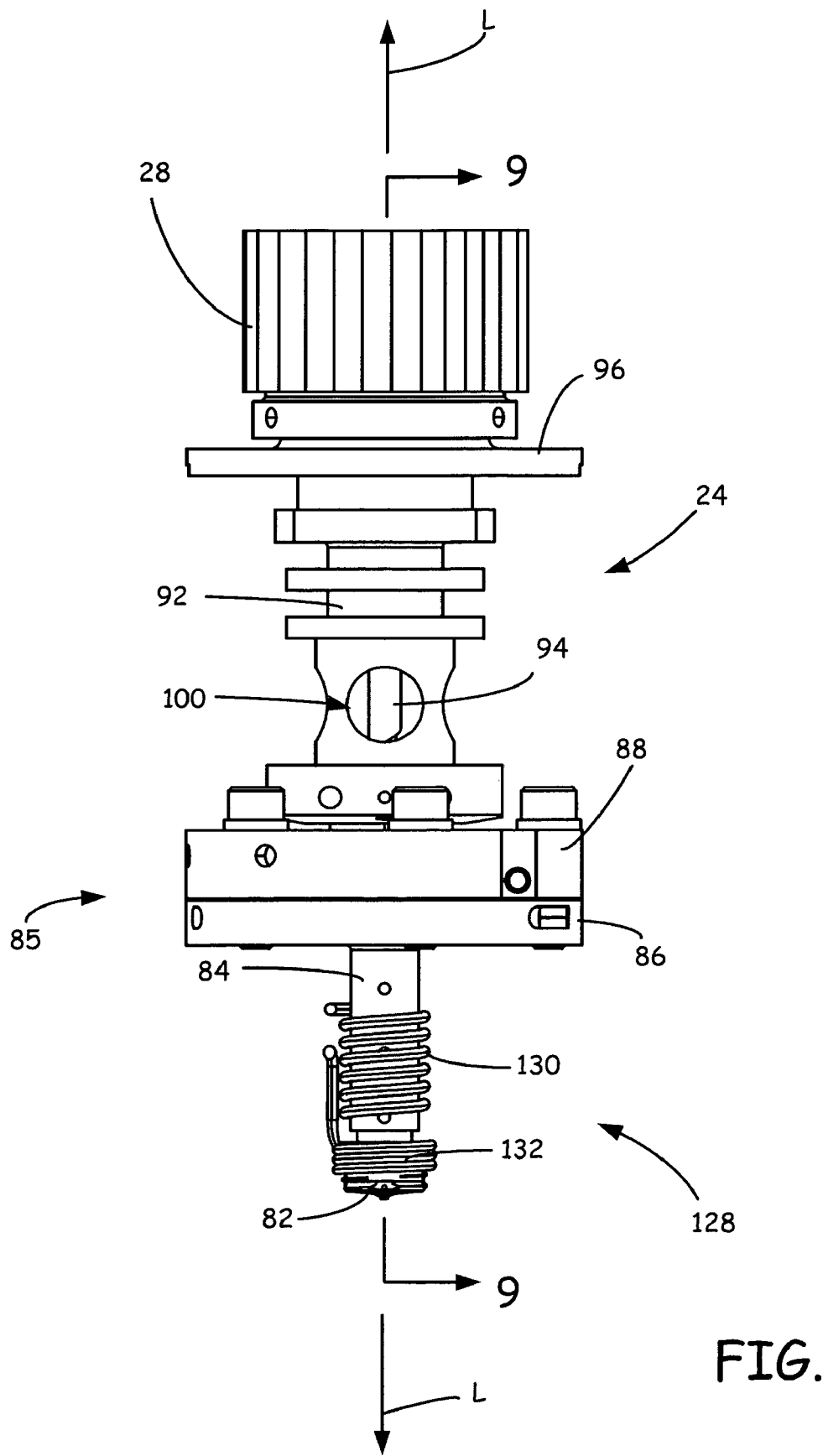
FIG. 8 is a side view of the screw pump in use with an external heating system.
Figure 9:
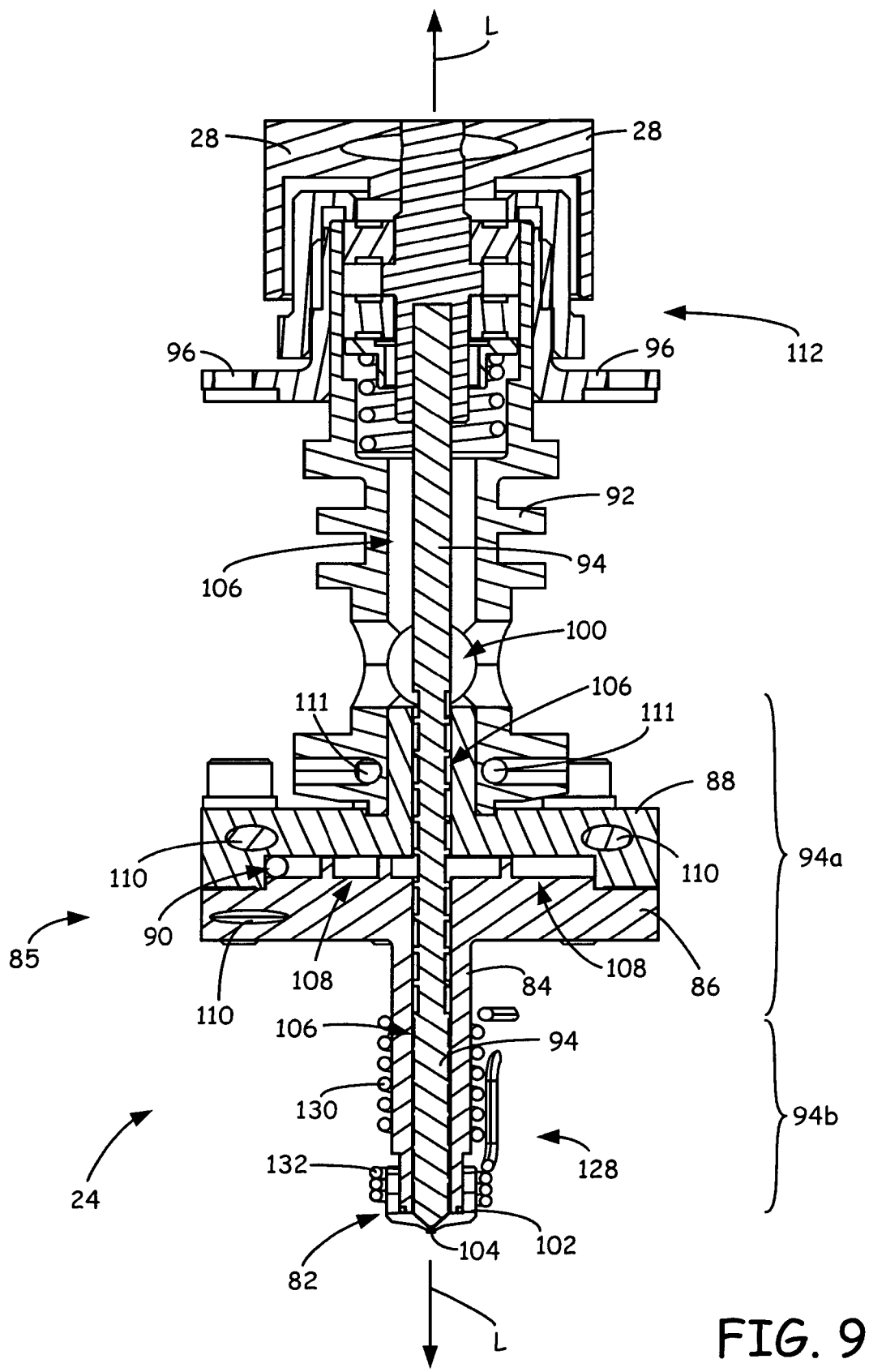
FIG. 9 is a sectional view of section 9-9 taken in FIG. 8.

FIG. 8 is a side view of screw pump 24 extending along longitudinal axis L, where screw pump 24 is in use with external heating system 128. FIG. 9 is a sectional view of section 9-9 taken in FIG. 8, further illustrating external heating system 128. As shown in FIGS. 8 and 9, external heating system 128 includes upper heating coil 130 and lower heating coil 132, which are connected to thermal control sources (not shown). Upper heating coil 130 is wrapped around barrel housing 84 to conductively heat barrel housing 84 during an extrusion process. Similarly, lower heating coil 132 is wrapped around extrusion tip 82 to conductively heat extrusion tip 82 during an extrusion process.

In one embodiment, one or both of upper heating coil 130 and lower heating coil 132 may be independently controlled via temperature feedbacks monitored with one or more thermocouples (not shown). The use of external heating system 128 reduces the risk of the flowable material cooling while being pumped with impeller 94, which may otherwise result in the flowable material clogging barrel 106, vent aperture 100, and/or orifice 104. In alternative embodiments, additional thermal zones may be added between liquefier cavity 108 and extrusion tip 82, as well as above liquefier cavity 108. The amount of heat required by barrel 106 and orifice 104 typically varies with the recent history of flow rate through screw pump 24.

Figure 10:
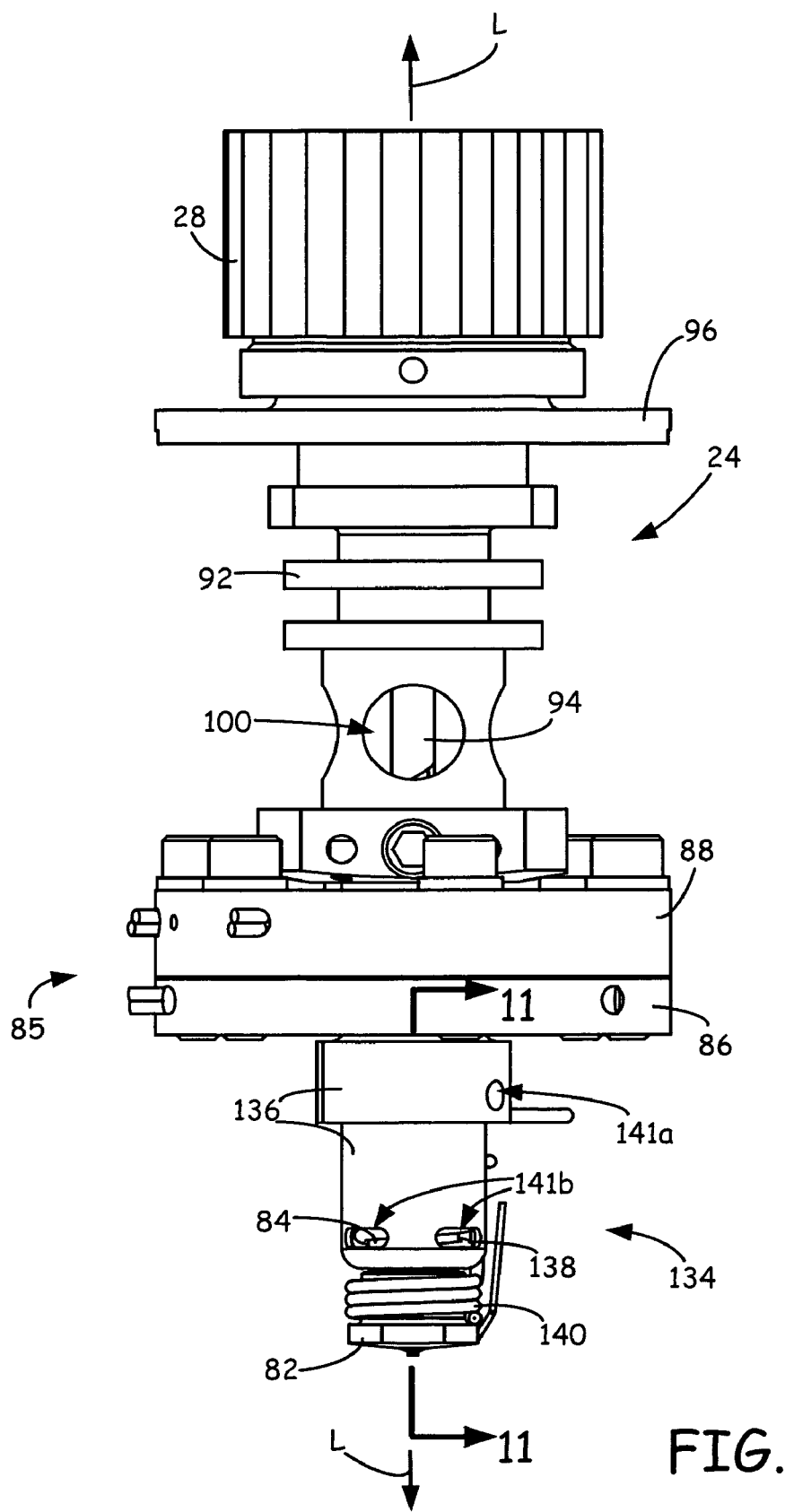
FIG. 10 is side view of the screw pump in use with an alternative heating and cooling system.
Figure 11:
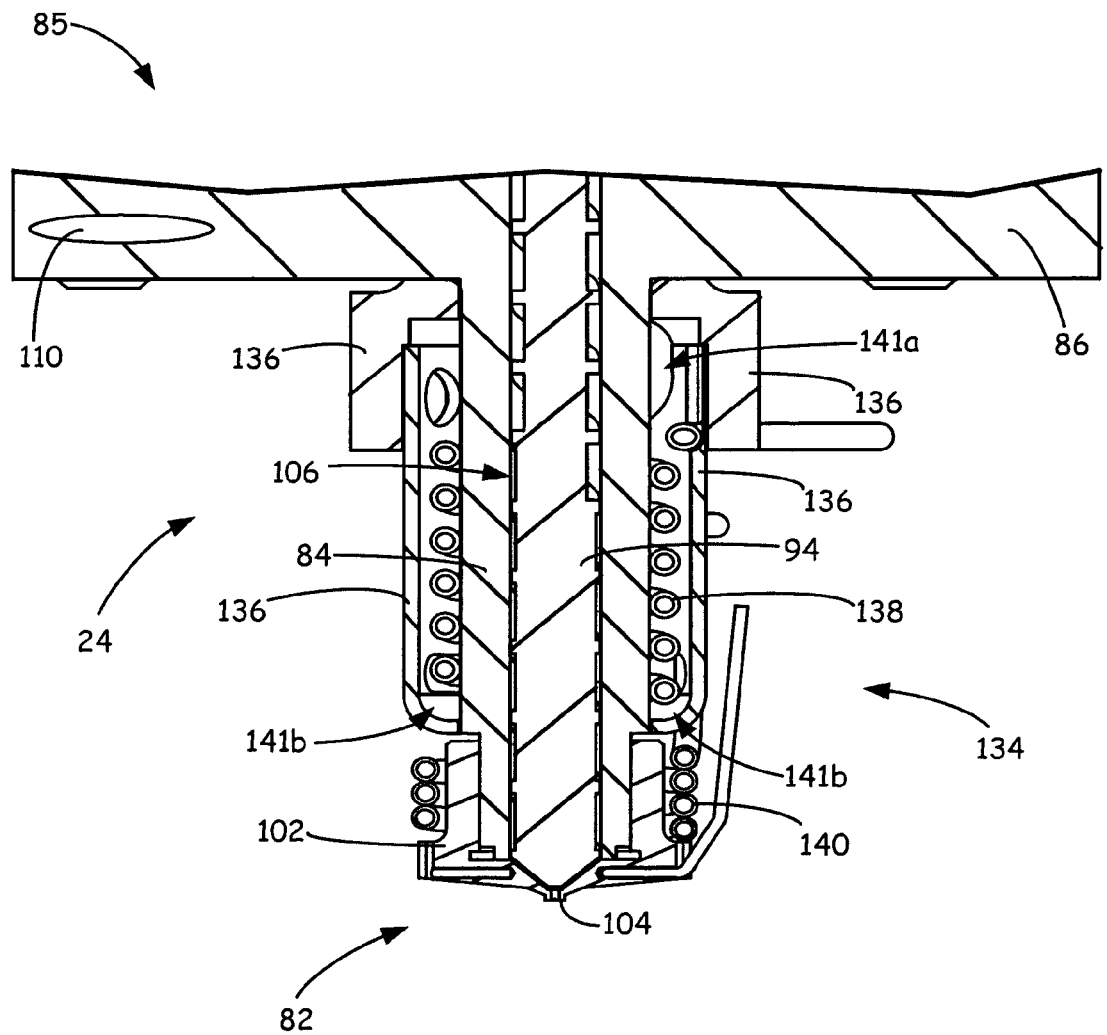
FIG. 11 is a sectional view of section 11-11 taken in FIG. 10.

FIG. 10 is an expanded side view of screw pump 24 extending along longitudinal axis L, where screw pump 24 is use with thermal sleeve 134. FIG. 11 is a sectional view of section 11-11 taken in FIG. 10, further illustrating thermal sleeve 134. As shown in FIGS. 10 and 11, thermal sleeve 134 includes sleeve housing 136, upper heater coil 138, and lower heater coil 140. Sleeve housing 136 extends around barrel housing 84 and substantially encases upper heater coil 138. Upper heater coil 138 is wrapped around barrel housing 84 to convectively heat barrel housing 84 during an extrusion process. Similarly, lower heater coil 140 is wrapped around extrusion tip 82 to convectively heat extrusion tip 82 during an extrusion process.

In one embodiment, one or both of upper heater coil 138 and lower heater coil 140 may be independently controlled via temperature feedbacks monitored with one or more thermocouples (not shown). This provides greater temperature control along extrusion tip 82 and barrel housing 84. For example, upper heater coil 138 may be controlled to obtain a desired temperature profile along barrel housing 84, which is monitored with a thermocouple. A similar arrangement is applicable to lower heater coil 140 as well. In alternative embodiments, additional thermal zones may be added between liquefier cavity 108 and extrusion tip 82, as well as above liquefier cavity 108. In another embodiment, a compressed gas source (not shown) may be connected to gas inlet 141a. In this embodiment, a heated or coolant gas may flow into gas inlet 141a, between barrel housing 84 and sleeve housing 136, and out from gas outlets 141b. This provides further temperature control along extrusion tip 82 and barrel housing 84. The external heating and cooling systems discussed above in FIGS. 8-11 are examples of suitable external temperature control systems that may be used with screw pump 24.

Figure 12:
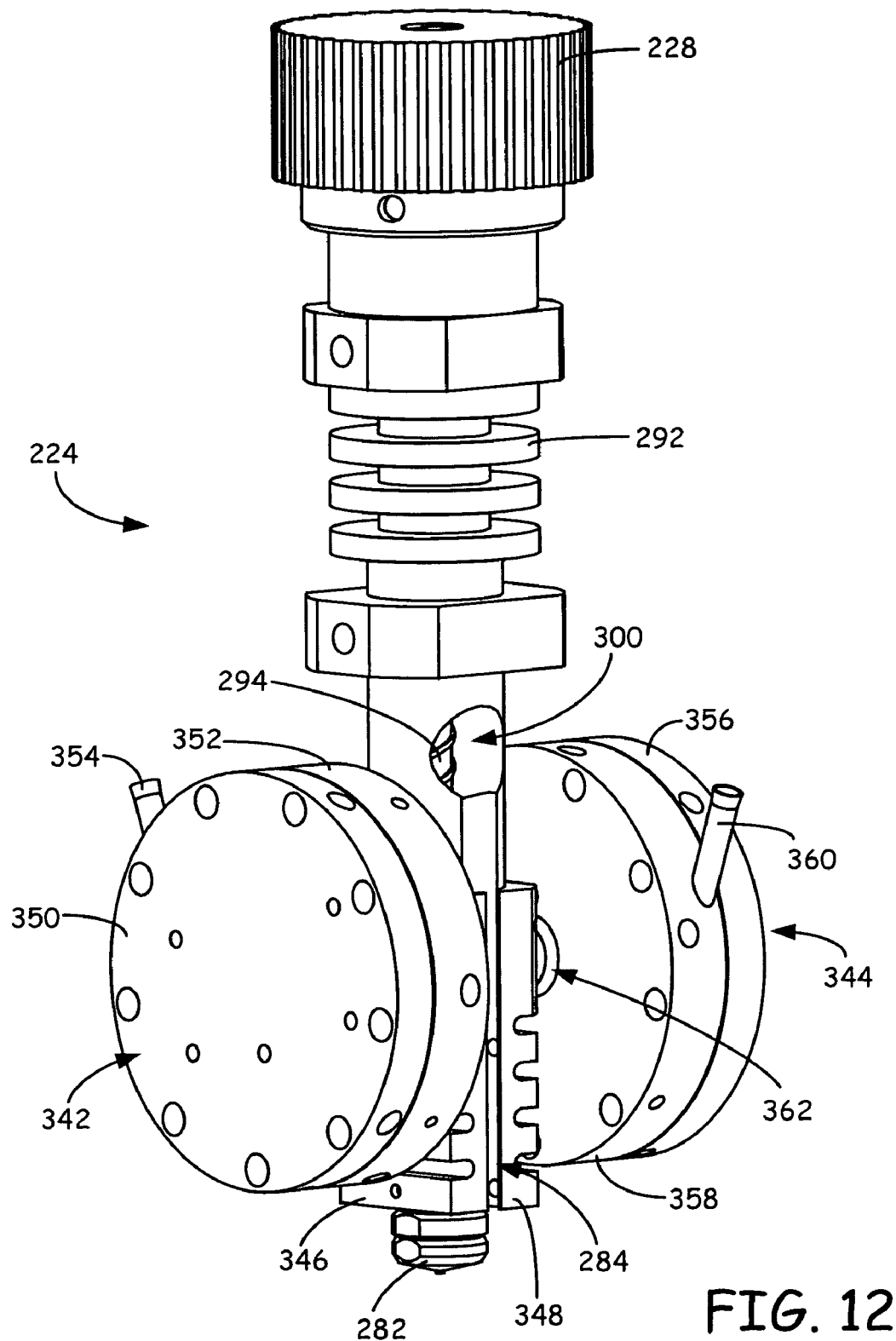
FIG. 12 is a perspective view of an alternative screw pump of the two-stage pump system.

FIG. 12 is a perspective view of screw pump 224, which is an alternative to screw pump 24 for use in pump system 10. For ease of discussion, reference labels corresponding to the components of screw pump 24 are increased by 200. In this embodiment, screw pump 224 includes a pair of liquefiers 342 and 344, which function in the same manner as liquefier 85 of screw pump 24 (shown in FIGS. 3, 4, and 6). Screw pump 224 also includes support braces 346 and 348 secured around barrel housing 284 for respectively securing liquefiers 342 and 344 to barrel housing 284.

Liquefier 342 includes liquefier housings 350 and 352, feed channel 354, and an exit channel (not shown) in liquefier housing 352, where liquefier housing 352 is the portion of liquefier 342 that is secured to barrel housing 284 via support brace 346. This allows the exit channel from liquefier 342 to intersect with barrel 306 (not shown). Liquefier 344 includes liquefier housings 356 and 358, feed channel 360, and exit channel 362, where liquefier housing 356 is the portion of liquefier 344 that is secured to barrel housing 284 via support brace 348. This allows exit channel 362 to intersect with barrel 306 and the exit channel from liquefier 342.

Liquefiers 342 and 344 allow multiple materials to be fed into barrel 306. For example, in one embodiment, a build material and a support material may be fed in successive extrusion steps through barrel 306 and extrusion tip 282 without requiring calibration and registration of multiple tips. When switching from one material to another, the first material is desirably purged from screw pump 242 before depositing the second material. Purging may be done by supplying and extruding the second material while positioning the extrusion tip 282 over a waste receptacle (not shown), for a time sufficient to eliminate the first material from the barrel 306.

Alternatively, multiple build or support materials may be mixed (via impeller 294) and extruded together. This allows different types of build or support materials to be mixed to increase desired physical properties of the resulting 3D object or support structure. In this embodiment, a first filament of build or support material (not shown) may be fed into feed channel 354, and is melted within liquefier 342 as discussed above for liquefier 85. The melted, flowable material then flows through the exit channel of liquefier 342, and into barrel 306. Similarly, a second filament of build or support material (not shown) may be fed into feed channel 360, and is melted within liquefier 344 as discussed above for liquefier 85. The melted, flowable material then flows through exit channel 362, and into barrel 306. Impeller 300 then mixes the flowable materials as the flowable materials are forced through barrel 306 toward extrusion tip 282. The mixed flowable materials are then extruded through extrusion tip 382 to form the resulting 3D object or support structure.

Multiple liquefiers (e.g., liquefiers 342 and 344) also permit the use of different colored build and support materials. Filaments of different colors can be supplied simultaneously to screw pump 242 and can be combined with the mixing action of screw pump 242 to produce a full color gamut for the resulting 3D object or support structure.

In alternative embodiments, screw pump 242 may include more than two liquefiers. When multiple liquefiers are used (e.g., as with screw pump 242), each filament is desirably fed to the given liquefier with its own material advance mechanism (e.g., filament delivery assembly 22) to independently control the feed rates of the filaments.

Figure 13:
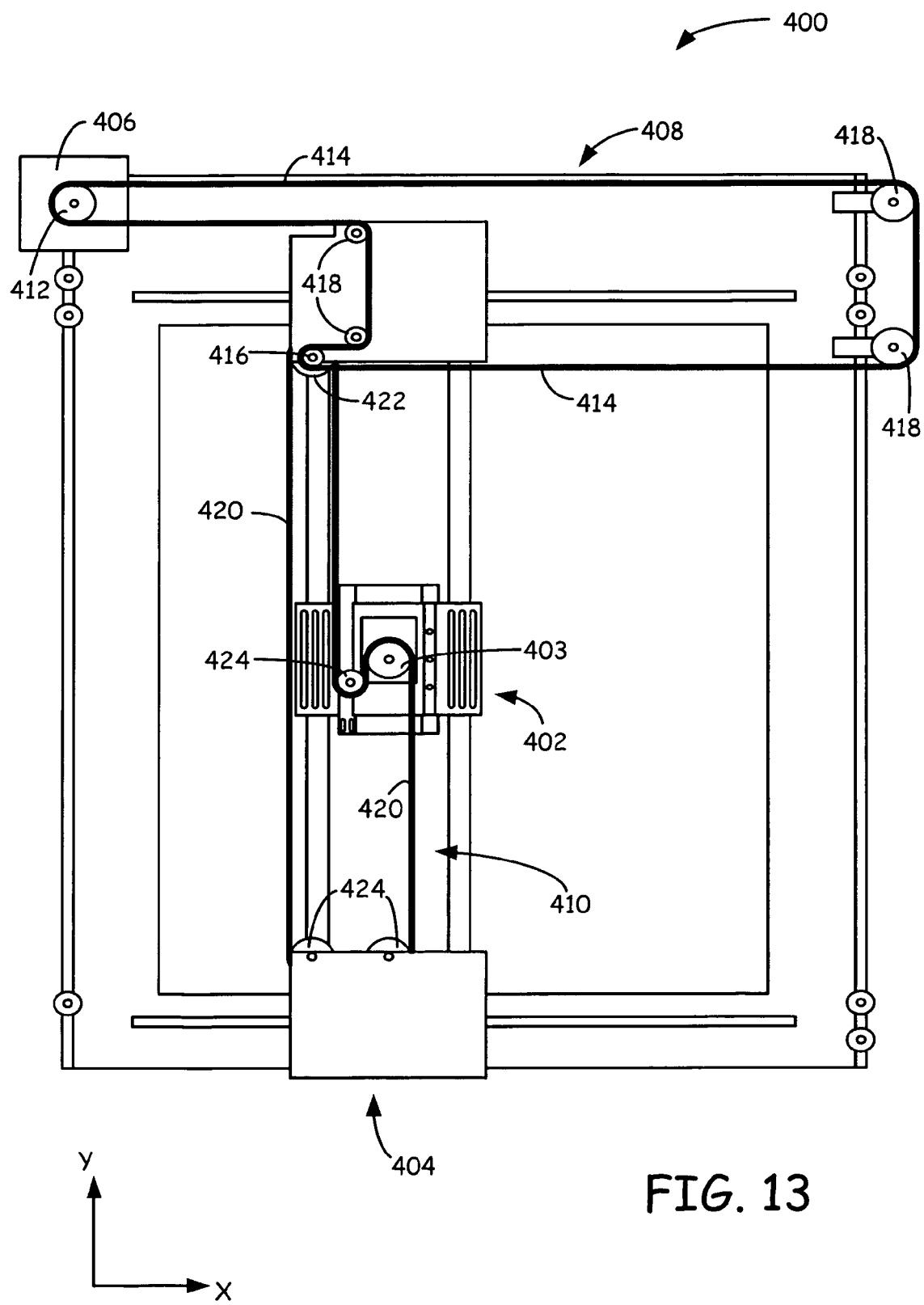
FIG. 13 is a top view of an extrusion apparatus containing an alternative two-stage pump system.

FIG. 13 is a top view of extrusion apparatus 400, which is an alternative embodiment in which the drive motor for screw pump 24 is located at a remote location from pump system 10. This is beneficial to minimize the payload carried by pump system 10. Additionally, this arrangement minimizes the number of wires going to the carriage of the gantry and also allows using the same motors for the X-Y-Z gantry and pump (e.g., a lower cost benefit).

As shown, extrusion apparatus 400 includes pump system 402, X-Y gantry 404, remote drive motor 406, first pulley section 408, and second pulley section 410. Pump system 402 is similar to pump system 10, except that drive motor 18 is omitted (and is replaced by remote drive motor 406). Pump system 402 includes belt pulley 403, which functions in the same manner as belt pulley 28 (shown in FIGS. 1A and 1B) for rotating a screw pump impeller (not shown). X-Y gantry 404 is a gantry assembly for moving pump system 402 around extrusion apparatus 400 in an X-Y plane for depositing build and/or support materials. Remote drive motor 406 includes motor pulley 412, which functions in the same manner as motor pulley 26 (shown in FIG. 1B).

First pulley section 408 includes drive belt 414, jackshaft input pulley 416, and idler pulleys 418, where drive belt 414 is looped around motor pulley 412, jackshaft input pulley 416, and idler pulleys 418. Second pulley section 410 includes drive belt 420, jackshaft output pulley 422, and idler pulleys 424, where drive belt 420 is looped around belt pulley 403, jackshaft output pulley 422, and idler pulleys 424. Jackshaft output pulley 422 is axially connected to jackshaft input pulley 416.

This arrangement allows remote drive motor 406 to rotate belt pulley 403 (and correspondingly the screw pump impeller of pump system 402). During operation, remote drive motor 406 causes motor pulley 412 to rotate. This correspondingly causes drive belt 414 to rotate jackshaft input pulley 416. The rotation of jackshaft input pulley 416 causes jackshaft output pulley 422 to rotate, thereby causing drive belt 420 to rotate belt pulley 403 (and the impeller of the screw pump).

Remote drive motor 406 is desirably moved to "subtract out" the motion of X-Y gantry 404 so that the motion of X-Y gantry 404 does not rotate the impeller. The rotational speed at which remote drive motor 406 may be controlled in order to nullify the motor of X-Y gantry 404 can be calculated mathematically according to the following equations:

The following definitions are used:
$W_{motor}$=rotational speed of motor
$W_{jack}$=rotational speed of jack shaft
$PD_{motor}$=pitch diameter of motor pulley
$PD_{jackin}$=pitch diameter of jackshaft input pulley
$PD_{jackout}$=pitch diameter of jackshaft output pulley
$PD_{screw}$=pitch diameter of screw pulley
$V_x$=carriage velocity in X direction
$V_y$=carriage velocity in Y direction The rotational speed of the jack shaft and motor are given by the equations:

$$W_{jack}=W_{motor}(PD_{motor}/PD_{jackin})-V_x/\pi PD_{jackin} \quad \text{(Equation 5)}$$

$$W_{screw}=W_{jack}(PD_{jackout}/PD_{screw})-V_y/\pi PD_{screw} \quad \text{(Equation 6)}$$

Substituting Equation 5 for $W_{jack}$ in Equation 6 provides:

$$W_{screw}=(W_{motor}(PD_{motor}/PD_{jackin})-V_x/\pi PD_{jackin})(PD_{jackout}/PD_{screw})-V_y/\pi PD_{screw} \quad \text{(Equation 7)}$$

Equation 7 may be manipulated to solve for $W_{motor}$:

$$(W_{screw}+V_y/\pi PD_{screw})(PD_{screw}/PD_{jackout})=W_{motor}(PD_{motor}/PD_{jackin})-V_x/\pi PD_{jackin} \quad \text{(Equation 8)}$$

$$W_{motor}=((W_{screw}+V_y/\pi PD_{screw})(PD_{screw}/PD_{jackout})+V_x/\pi PD_{jackin})PD_{jackin}/PD_{motor} \quad \text{(Equation 9)}$$

According to Equation 9, the rotational speed of remote drive motor 406 ($W_{motor}$) will be matched to the motion of X-Y gantry 404, allowing accurate control of the screw pump impeller through drive belts 414 and 420.

The drive motor for each filament delivery assembly (e.g., drive motor 16) may also be mounted on the extrusion head, X-Y gantry 404, or on a stationary part of extrusion apparatus 400 in a similar manner. At a remote location the filament delivery assemblies can provide adequate forces to push the filaments into the screw pump. This lowers the payload weight carried by X-Y gantry 404, simplifies the mechanical assemblies, and minimizes the size of the carriage on X-Y gantry 404.

As discussed above, the build materials for use in pump systems 10 and 402 are desirably provided in a filament form. Examples of suitable filament materials and filament sources are disclosed in Swanson et al., U.S. Pat. No. 6,923,634 and Comb et al., U.S. Publication No. 2005/0129941. Examples of suitable materials for the build material include any type of extrudable thermoplastic material, such as acrylonitrile-butadiene-styrene (ABS), polycarbonate, polyphenylsulfone, polysulfone, nylon, polystyrene, amorphous polyamide, polyester, polyphenylene ether, polyurethane, polyetheretherketone, and copolymers thereof, combinations thereof. While the above discussion refers to the use of build materials, pump systems 10 and 402 are also suitable for extruding support materials to build support structures. Examples of suitable water-soluble support materials include those commercially available under the trade designations "WATERWORKS" and "SOLUBLE SUPPORTS" from Stratasys, Inc., Eden Prairie, Minn.

As discussed above, pump system 10 (and pump system 402) provides a suitable extrusion system for use as an extrusion head in an extrusion-based layered manufacturing system. Examples of beneficial properties of pump system 10 include fast and consistent response times, high flow rates (e.g., 20,000 cubic-microinches/second), de-couples flow rates and response times, deposits multiple types of build and support materials, minimizes the number of components needing replacement when materials are changed, minimizes the extrusion head and X-Y gantry mass, requires no calibration or registration between nozzles, minimizes the cost of feed stock materials, minimizes the pump fabrication costs, minimizes wear parts, eliminates screw to bore misalignment, operates at high temperature to pump high temperature materials (e.g., above 400° C.), and allows for full-spectrum color modeling.

Although the present invention has been described with reference to preferred embodiments, workers skilled in the art will recognize that changes may be made in form and detail without departing from the spirit and scope of the invention. For example, while pump system 10 is discussed above for use in extrusion-based layered manufacturing systems, pump system 10 is also suitable for use in any type of extrusion-based deposition systems for building 3D objects.

The invention claimed is:

1. A pump system comprising:
    a first drive motor and a second drive motor;
    a delivery assembly operably engaged with the first drive motor and configured to feed a solid material under operational power of the first drive motor; and
    a screw pump comprising:
        a housing that at least partially defines a barrel of the screw pump;
        an extrusion tip secured to the housing at a first end of the barrel;
        a liquefier secured to the housing and intersecting with the barrel, the liquefier being configured to receive the solid material fed from the delivery assembly, to at least partially melt the received solid material, and to direct the at least partially melted material to the barrel, wherein the liquefier comprises a spiral baffle; and
        an impeller extending at least partially through the barrel, and configured to drive the at least partially melted material that is directed to the barrel toward the extrusion tip under operational power of the second drive motor.

2. The pump system of claim 1, wherein the solid material is provided as a filament, and wherein the delivery assembly comprises:
   a plurality of engaged gears, wherein at least one of the engaged gears is the portion of the delivery assembly that is operably engaged with the first drive motor;
   a first drive roller axially engaged with a first gear of the plurality of engaged gears; and
   a second drive roller axially engaged with a second gear of the plurality of engaged gears, wherein the first drive roller and the second drive roller are configured to engage the filament.

3. The pump system of claim 2, wherein the second drive roller is biased to change a pinch force between the first drive roller and the second drive roller in response to a change in a resistive force of the filament.

4. The pump system of claim 1, wherein the liquefier comprises a cylindrical cavity that is substantially concentric with the impeller.

5. The pump system of claim 1, wherein the impeller at least partially defines a pressurizing zone and a transport zone in the barrel, the transport zone being adjacent the liquefier, and the pressurizing zone being adjacent the extrusion tip.

6. The pump system of claim 1, further comprising an external temperature control system that extends around at least a portion of the housing.

7. The pump system of claim 1, wherein the liquefier is a first liquefier and the solid material is a first solid material, wherein the pump system further comprises a second liquefier secured to the housing and intersecting with the barrel, the second liquefier being configured to receive a second solid material, to at least partially melt the received second solid material, and to direct the at least partially second melted material to the barrel.

8. A pump system for extruding thermoplastic material supplied as a filament, the pump system comprising:
   a pair of drive rollers that are configured to feed successive portions of the filament;
   a housing that at least partially defines a barrel having a first end and a vent aperture;
   a liquefier housing secured to the housing and defining a liquefier cavity that extends circumferentially around the barrel at a location between the first end of the barrel and the vent aperture of the barrel, wherein the liquefier comprises a spiral baffle;
   a feed channel extending through the liquefier housing, and configured to direct the successive portions of the filament fed from the pair of drive rollers to the liquefier cavity;
   an extrusion tip secured to the housing at the first end of the barrel; and
   an impeller extending through the barrel and comprising a plurality of grooves that vary in depth along a longitudinal axis of the impeller at least between the liquefier cavity and the first end of the barrel.

9. The pump system of claim 8, wherein at least one of the pair of drive rollers is biased to change a pinch force between the pair of drive rollers in response to a change in a resistive force of the filament.

10. The pump system of claim 8, wherein the impeller at least partially defines a pressurizing zone and a transport zone in the barrel, the transport zone being adjacent the liquefier cavity, and the pressurizing zone being adjacent the extrusion tip.

11. The pump system of claim 10, wherein the transport zone extends at least between the liquefier cavity and the vent aperture.

12. The pump system of claim 8, wherein the pair of drive rollers and the impeller are configured to be operated by separate drive motors.

13. An extrusion apparatus for building three-dimensional objects, the extrusion apparatus comprising:
   a pump system comprising:
      a first drive motor;
      a filament delivery assembly operably engaged with the first drive motor and configured to feed a filament of a thermoplastic material under operational power of the first drive motor; and
      a screw pump comprising:
         a housing that at least partially defines a barrel of the screw pump;
         an extrusion tip secured to the housing at a first end of the barrel;
         a liquefier secured to the housing and intersecting with the barrel, the liquefier comprising a feed channel configured to receive the filament fed from the filament delivery assembly; and
         an impeller extending at least partially through the barrel;
   a gantry assembly configured to move the pump system in at least one direction;
   a second drive motor disposed at a remote location from the pump system and the gantry assembly; and
   a belt pulley assembly configured to engage the second drive motor to the impeller of the pump system, thereby allowing the impeller to rotate under operational power of the second drive motor, wherein the belt pulley assembly comprises:
      a first pulley portion comprising:
         a first pulley; and
         a first drive belt engaged with the first pulley and the second drive motor, thereby allowing the first pulley to rotate under operational power of the second drive motor;
      a second pulley portion comprising:
         a second pulley axially connected to the first pulley, thereby allowing the rotation of the first pulley to rotate the second pulley; and
   a second drive belt engaged with second pulley and the impeller, thereby allowing the rotation of the second pulley to rotate the impeller.

14. The extrusion apparatus of claim 13, wherein the liquefier comprises a spiral baffle.

15. The extrusion apparatus of claim 13, wherein the second drive motor is configured to subtract out the motion of the gantry assembly so that the motion of the gantry assembly does not rotate the impeller.

16. The extrusion apparatus of claim 13, wherein the filament delivery assembly comprises:
   a plurality of engaged gears, wherein at least one of the engaged gears is the portion of the filament delivery assembly that is operably engaged with the first drive motor;
   a first drive roller axially engaged with a first gear of the plurality of engaged gears; and
   a second drive roller axially engaged with a second gear of the plurality of engaged gears, wherein the first drive roller and the second drive roller are configured to engage the filament.

17. The extrusion apparatus of claim 16, wherein the second drive roller is biased to change a pinch force between the first drive roller and the second drive roller in response to a change in a resistive force of the filament.

18. The extrusion apparatus of claim 13, wherein the liquefier comprises a cylindrical cavity that is substantially concentric with the impeller.

19. The extrusion apparatus of claim 13, wherein the impeller at least partially defines a pressurizing zone and a transport zone in the barrel, the transport zone being adjacent the liquefier, and the pressurizing zone being adjacent the extrusion tip.

* * * * *